(12) United States Patent
Hayman et al.

(10) Patent No.: US 6,601,557 B1
(45) Date of Patent: Aug. 5, 2003

(54) ENGINE OIL PUMP AND BALANCE SHAFT MODULE

(75) Inventors: Alan William Hayman, Romeo; David Richard Staley, Flushing; Rolland Dominic Giampa, Caro, all of MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 09/949,515

(22) Filed: Sep. 7, 2001

(51) Int. Cl.[7] .................................................. F02B 75/06
(52) U.S. Cl. ................................. 123/192.2; 123/196 R
(58) Field of Search ........................... 123/192.2, 196 R, 123/198 C Primary Examiner—Noah P. Kamen
(74) Attorney, Agent, or Firm—Leslie C. Hodges

(57) ABSTRACT

A combined oil pump and balance module for mounting in an oil sump of a reciprocating piston engine includes a housing supporting a rotatable balance shaft carrying at opposite ends balance weights for offsetting unbalance forces of the engine. The balance weights are enclosed in open top enclosures from which oil is pumped by vanes on the weights and an associated gear, driven by the engine crankshaft. A pair of oil pumps are mounted on opposite ends of the housing inboard of the weights. The pumps draw oil from the sump through housing passages and deliver the oil to one or more engine oil systems. In one embodiment, the first pump feeds oil to a lubrication system and to the second pump, which delivers oil at a higher pressure to a hydraulic actuating system of the engine.

8 Claims, 3 Drawing Sheets

ENGINE OIL PUMP AND BALANCE SHAFT MODULE

TECHNICAL FIELD

This invention relates to engine balancing and, more particularly, to a combination oil pump and balance shaft module for attachment to an engine frame or crankcase.

BACKGROUND OF THE INVENTION

It is known in the art relating to reciprocating piston engines to provide one or more balance shafts with balance weights to offset various types of engine unbalance created by the arrangement of the rotating and reciprocating components of the engine. Such balance shafts may be mounted at various locations in or on the engine, depending on the particular type of unbalance forces involved and the space available within or around the engine envelope. In some cases, it is convenient to provide one or more balance shafts located within a module which may be separately assembled and then attached to the frame or crankcase of an engine, sometimes for operation within the engine oil pan.

SUMMARY OF THE INVENTION

The present invention provides such a balance shaft module for mounting below the engine frame or crankcase. The module includes a housing supporting a balance shaft geared to the engine crankshaft and having balance weights at opposite ends which are rotated to offset unbalance forces developed by the engine components. Covers are provided around the balance weights to limit contact of the weights with oil in the crankcase. The covers are open at the top, and pumping vanes are provided in conjunction with the balance weights to pump out any oil entering into the enclosed space. One of the balance weights is preferably mounted on a driven gear of the balance shaft which engages a mating gear on the crankshaft for driving the balance weights.

The module of the invention further includes a pair of oil pumps mounted on opposite ends of the housing and having rotors driven by the balance shaft. The housing includes an oil pickup inlet through which oil is drawn into the separate inlets of the oil pumps and oil is discharged through pump outlets to separate oil systems of the engine. In a preferred embodiment, a first one of the oil pumps delivers pressurized oil to the main lubrication system of the engine at a suitable pressure. A second one of the oil pumps has its inlet connected with the outlet of the first oil pump and delivers oil at a higher pressure to a separate engine system provided for actuating various devices within the engine structure.

These and other features and advantages of the invention will be more fully understood from the following description of certain specific embodiments of the invention taken together with the accompanying drawings.

DESCRIPTION OF THE PREFERRED EMBODIMENT

Figure 1:
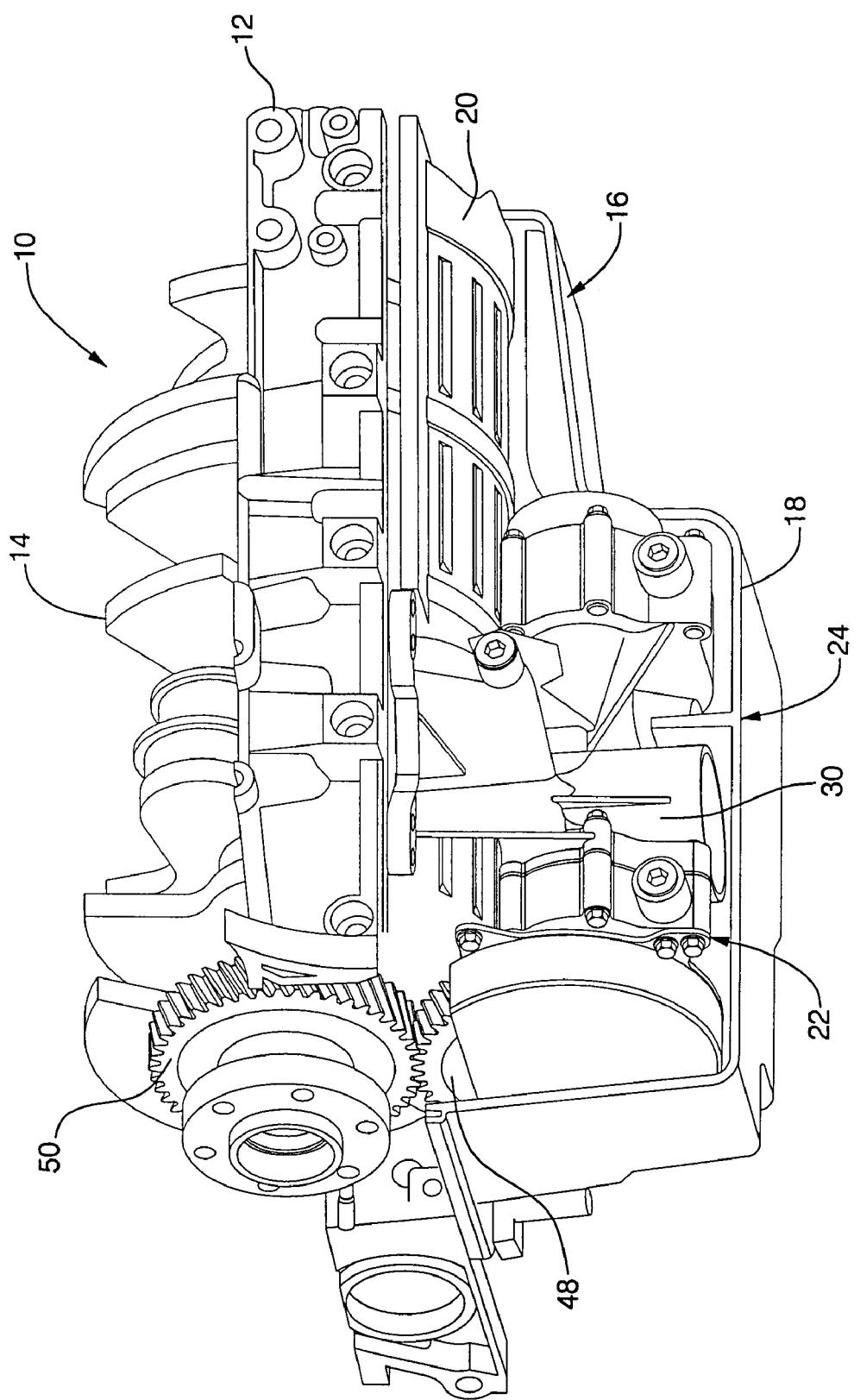
FIG. 1 is a pictorial view showing a lower portion of an engine crankcase and oil pan cut away to show internal portions of the engine and balance module.

Referring first to FIG. 1 of the drawings, numeral 10 generally indicates a portion of a reciprocating piston internal combustion engine with portions cut away to show a lower portion of the engine frame or crankcase 12 in which a crankshaft 14 is rotatably supported. In the engine the crankshaft is connected with connecting rods and pistons, not shown, which reciprocate within cylinders of a cylinder block in a known manner. An oil pan 16 is mounted to a lower side of the crankcase and provides an enclosure including a deep sump 18 for containing the lubricating oil in the engine. A windage tray 20 is mounted to the crankcase and extends below the crankshaft to provide partial separation between the crankcase area and the oil sump.

Figure 2:
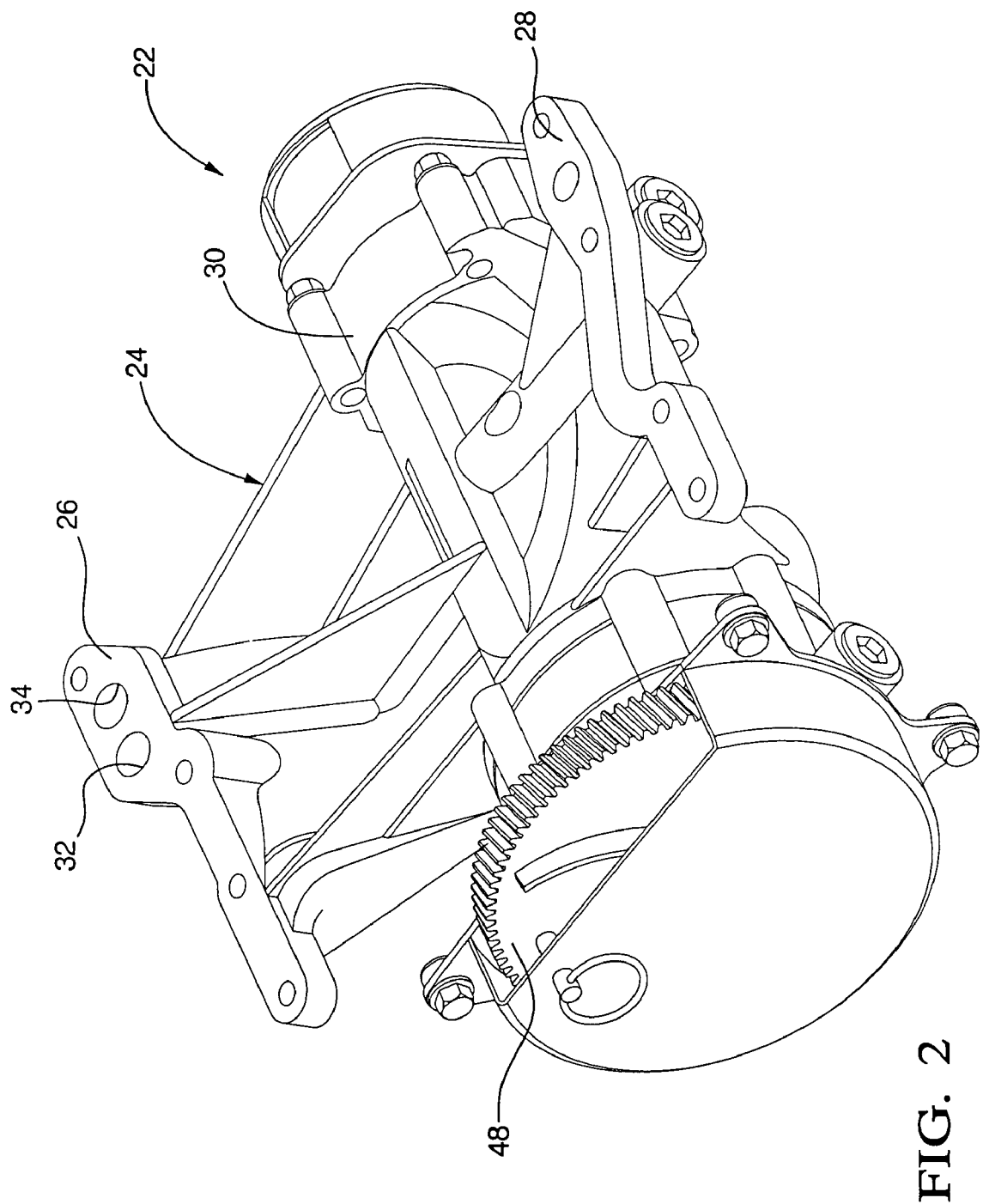
FIG. 2 is a pictorial view of the assembled oil pump and balance shaft module.

In accordance with the invention, an oil pump and balance shaft module 22 is mounted below the crankcase and extends into the oil sump 18 of the oil pan. Module 22, shown also in FIGS. 2 and 3, includes a housing 24 having spaced flanges 26, 28 adapted to be mounted against mounting surfaces on the lower side of the crankcase 12. The flanges connect inwardly with a main body 30 which is carried under the windage tray between and slightly below the flanges. Flange 26 includes openings from internal oil passages 32, 34 to be subsequently described.

Figure 3:
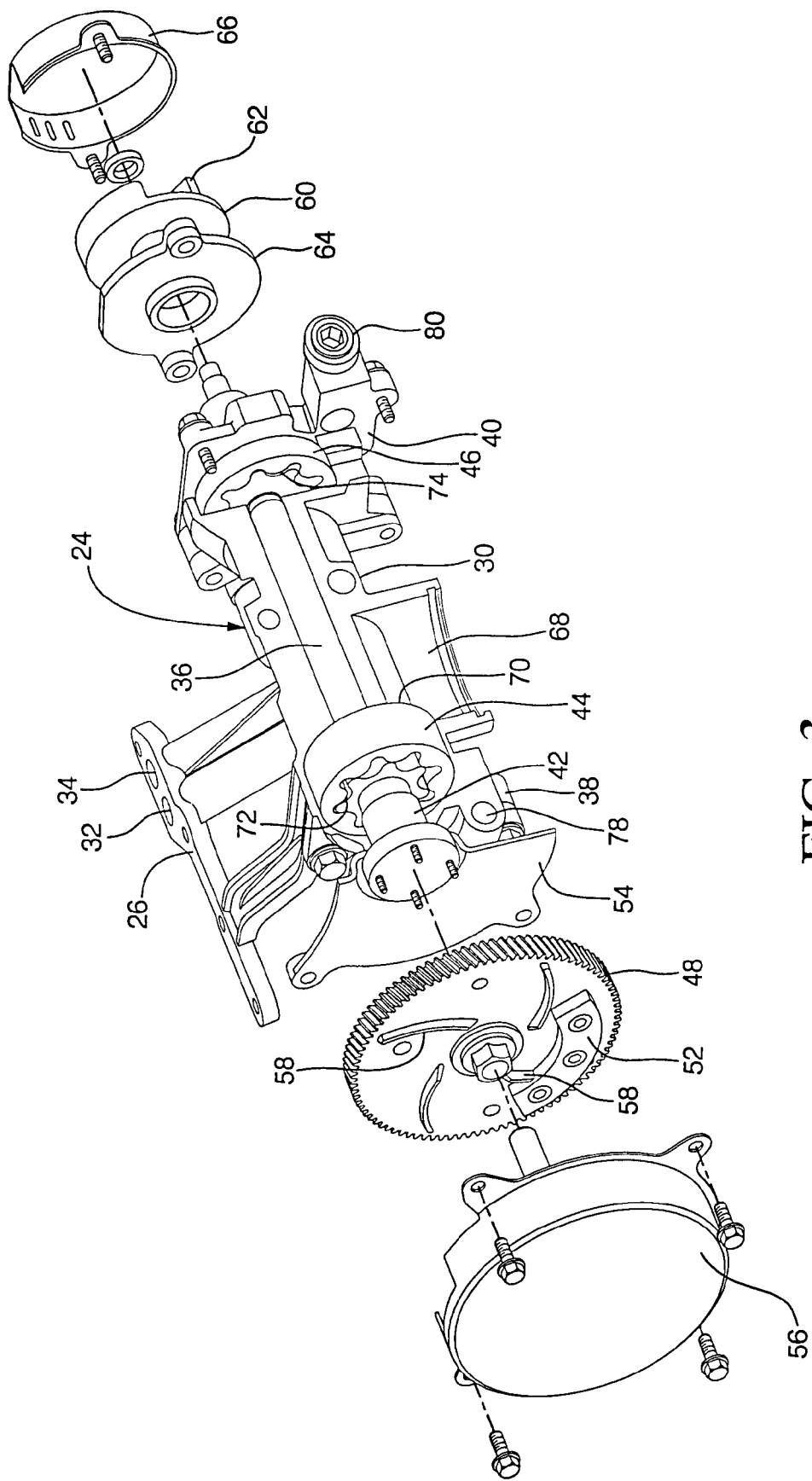
FIG. 3 is an exploded pictorial view partially broken away to show interior and exterior features of the module.

As is best seen in FIG. 3, a balance shaft 36 is rotatably supported in the housing 24 and extends through first and second oil pump bodies 38, 40 in which the shaft is carried by bushings 42, only one of which is shown. Each oil pump body 38, 40 surrounds a pump rotor 44, 46. The rotors are rotatably connected with the shaft 36 for driving of the pump rotors in a conventional manner.

At one end of the shaft 36 adjacent the first oil pump, a driven gear 48 is bolted. When installed in the engine, the gear 48 engages a mating drive gear 50 mounted on the rear end of the crankshaft 14 for driving the balance shaft 36. Driven gear 48 carries a balance weight 52 which forms a first balance weight for the module located at the gear end or forward end of the module 22. The gear and balance weight 48, 52 are essentially enclosed between inner and outer covers 54, 56 which provide an enclosure open at the top for keeping sump oil away from the rotating gear 50 and balance weight 52. Vanes 58 formed on the drive gear and balance weight act to pump out through the top of the enclosed space any oil which enters the enclosure through the open top.

At the rear end of the balance shaft 36, a second balance weight 60 is mounted and is rotatable with the shaft 36. Balance weight 60 is formed as a disc with one side weighted. It may also include vanes 62. Inner and outer covers 64, 66 enclose the balance weight 60. Slots are provided in the outer cover 66 so the vanes 62 may pump oil entering the enclosure out through the openings formed by the slots.

The module housing 24 is also provided with an inlet passage or oil pickup 68 which extends downward near the bottom of the oil pan sump to draw oil into the housing. The oil is conducted through internal passages, not shown, to the first pump rotor 44 by an internal inlet 70. An outlet 72 from the first pump rotor delivers oil through passage 32 to the engine for lubricating the various engine components. The internal passage also connects internally with an inlet 74 of the second pump rotor 46. An outlet 78 from pump rotor 46 connects internally with the passage 34 of the flange 26 through which pressure oil is delivered to a second oil system of the engine.

In a preferred embodiment, the first oil pump rotor 44 pumps oil at a first controlled pressure for use in the engine oil lubricating system while the second oil pump rotor 46 receives pressure oil from the first pump and delivers it at a higher pressure to a second engine oil system which is utilized for actuating hydraulic devices within the engine. Such devices may, for example, include camshaft phase changers and/or cylinder deactivation devices for discontinuing operation of selected engine valves. Alternatively, the pumps may both draw oil directly from the sump and/or may supply pressure oil to one or more oil systems of the engine.

When the engine is operating, the oil pumps draw oil from the oil sump and deliver pressurized oil to the two engine oil systems as previously described. At the same time, the balance shaft rotates the balance weights mounted on either end of the shaft and creates a rotating unbalance couple which is phased relative to the engine crankshaft to oppose an unbalance couple inherent in the engine and thereby provide a system having primary balance of the components. The oil pump bodies 38, 40 include individual relief valves 78, 80 for controlling the pressure of oil delivered by their respective pumps. In addition, as previously mentioned, the enclosed spaces surrounding the drive gear and balance weights 48, 52, 60 are maintained relatively free of oil by the vanes 58, 62 which pump any oil entering the enclosed spaces out through the open tops of the enclosures.

The oil pump and balance shaft module of the engine accordingly carries out a combination of functions including: balancing of an engine rotating unbalance couple; supplying pressure oil to two different pressure systems of the engine, one of which may be at a higher pressure than the other; and allowing rotation of balance weights in the engine oil pan while maintaining covered rotation enclosures for the weights, from which oil is exhausted by vanes that force oil out through an open top above the level of oil in the pan during operation.

The module illustrated was developed for use with a 75 degree bank angle V8 engine to offset a primary rotating unbalance couple of the engine. However, the features of the module may also be applied to other engine configurations, including, for example, narrow bank angle V6 and V10 cylinder arrangements, as well as others. If desired, the dual pumps could be arranged so that one pump delivers oil at controlled pressure to a system at lower engine or pump speeds and the other pump delivers oil at controlled pressure to the system at higher engine or pump speeds.

While the invention has been described by reference to certain preferred embodiments, it should be understood that numerous changes could be made within the spirit and scope of the inventive concepts described. Accordingly, it is intended that the invention not be limited to the disclosed embodiments, but that it have the full scope permitted by the language of the following claims.

What is claimed is:

1. A module for attachment to a reciprocating piston engine having a crankshaft mounted in a frame, the module adapted for providing a dual pressure oil supply to the engine and a rotating unbalance couple for balancing an unbalance couple of the engine, said module comprising:

a housing adapted for mounting to the engine frame to extend below the crankshaft into an oil sump of the engine;

a balance shaft rotatably mounted in the housing and extending longitudinally through opposite ends of the housing;

first and second rotary oil pumps disposed at said opposite ends of the housing and including rotors drivably connected to the balance shaft, the oil pumps each having an inlet adapted for drawing oil from the sump and an outlet for delivering pressurized oil to an oil system of the engine;

a driven member mounted on one end of the balance shaft adjacent one of the oil pumps, the driven member being connectable with the engine crankshaft for rotating the balance shaft at predetermined function of the engine crankshaft speed; and a pair of balance weights carried at opposite ends of the balance shaft and positioned to create a rotating unbalance force for at least partially offsetting unbalance forces created by operation of the rotating and reciprocating masses of the engine.

2. A module as in claim 1 wherein said housing includes an inlet passage and said oil pump inlets are connected to receive oil entering the housing through the inlet passage.

3. A module as in claim 2 wherein said first oil pump inlet is directly connected with the inlet passage of the housing for drawing oil from the engine sump and said second oil pump inlet is connected to the outlet of the first oil pump for receiving pressurized oil therefrom and delivering the oil at a higher pressure through the second oil pump outlet.

4. A module as in claim 1 wherein one of said balance weights is mounted on the driven member.

5. A module as in claim 4 wherein the driven member is a gear adapted to engage a drive gear in the engine crankshaft.

6. A module as in claim 1 and including covers forming enclosures for the balance weights and the driven member, and vanes associated with the balance weights and the driven member to pump oil out of open upper portions of the enclosures to minimize frothing of the oil due to contact of oil with the driven member and the balance weights.

7. A module as in claim 1 wherein said balance weights are positioned at opposite angles to develop a rotating unbalance couple timed to offset an oppositely phased unbalance couple of the engine.

8. A module as in claim 6 wherein the module is adapted for use with a 75 degree bank angle V8 engine and the balance shaft is adapted to be driven at crankshaft speed in an opposite direction of rotation to offset a primary unbalance couple of the engine.

* * * * *